Figures 1, 2:
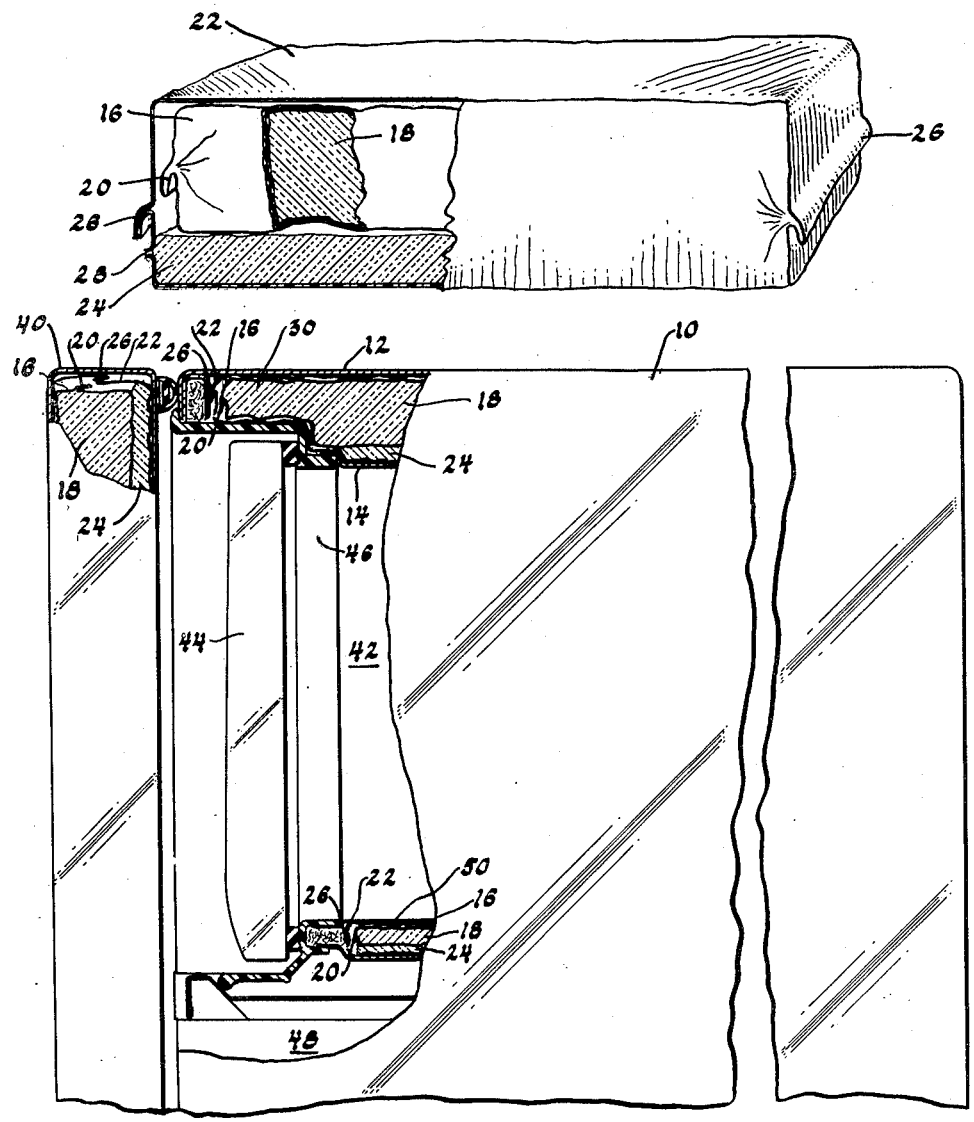

Dec. 24, 1957 J. W. JACOBS 2,817,123
REFRIGERATING APPARATUS
Filed March 24, 1955

INVENTOR.
James W. Jacobs
BY
R. R. Candor
His Attorney

United States Patent Office 2,817,123
Patented Dec. 24, 1957

2,817,123

REFRIGERATING APPARATUS

James W. Jacobs, Dayton, Ohio, assignor to General Motors Corporation, Detroit, Mich., a corporation of Delaware Application March 24, 1955, Serial No. 496,525

11 Claims. (Cl. 20—4)

This invention relates to refrigerating apparatus and more particularly to an improved type of insulation for use in the walls of a refrigerator or the like.

It is an object of this invention to provide a relatively thin insulation which makes use of the insulating properties of a low heat conductivity gas confined within a hermetically sealed bag.

Some of the problems of using a hermetically sealed bag are those of preventing puncture of the bag and preventing excessive bulging of the bag walls in response to internal pressure changes resulting from changes in temperature and/or elevation. It has been proposed to prevent bulging of the walls by using in conjunction with each bag a quilt of loose compressible insulation between the bag and one of the walls of the refrigerator so that as the bag tends to expand, it will merely compress the quilt of insulation rather than deforming the walls of the refrigerator. The disadvantage of such dual insulation is that it necessitates handling two different types of insulation on the assembly line and requires that the sealed insulating bags be protected against punctures. It is an object of this invention to overcome these problems by enclosing each sealed bag with a quantity of loose compressible insulation within an outer protective bag.

Further objects and advantages of the present invention will be apparent from the following description, reference being had to the accompanying drawings, wherein a preferred form of the present invention is clearly shown.

In the drawing:

Figure 1 is a perspective view with parts broken away showing a preferred type of bag insulation; and Figure 2 is a fragmentary side elevational view with parts broken away showing the arrangement of the bagged insulation within the walls of a refrigerator.

Referring now to the drawing wherein a preferred embodiment of the invention has been shown reference numeral 10 generally designates a refrigerator having an outer metallic shell 12 and an inner liner member 14 spaced from the outer shell 12 so as to provide room for insulation therebetween. The space between the walls is filled with a plurality of insulating bags which are of a special construction whereby it is possible to greatly reduce the thickness of the insulation required in the walls of a refrigerator. Each bag includes an inner hermetically sealed gas tight bag 16 containing glass fiber insulation 18 or the equivalent and an insulating gas such as difluorodichloromethane or sulphur hexafluoride. The material used in making the bag 16 is a laminated material in which one lamination is formed of mylar (polyester of ethylene glycol and terephthalic acid) which is relatively impervious to the passage of the insulating gas and another lamination is formed of saran (copolymer of vinyl chloride and vinylidene chloride) which is an excellent barrier to the passage of moisture and air and makes it possible to heat seal the seams 20 of the bag.

The bag 16 is placed in an outer bag 22 along with a pad of compressible fibrous insulation 24 which preferably consists of glass fibers or any other material having good insulating properties and capable of being compressed. The outer bag 22 is preferably made of polyethylene which is very strong or it could be made of paper impregnated with some material such as vinyl or saran. The seams 26 of the bag 22 are heat sealed as indicated at 26 so as to prevent the ingress of moisture into the insulation 24. In order to prevent changes in atmospheric pressure and temperature from causing bulging of the walls of the outer bags 22, each of the outer bags 22 is provided with a pin hole opening 28 which is large enough to prevent any appreciable build up of pressure within the bag but small enough to prevent objectionable ingress of moisture into the bag.

By virtue of the above described construction and arrangement it becomes possible for the workers on the main assembly line to install the hermetically sealed bag 16 and the compressible pad or quilt type insulation 24 between the inner and outer walls of the refrigerator, without having to handle the two different kinds of insulation separately. Furthermore, the likelihood of puncturing the inner sealed bag 16 is greatly reduced as the outer bag 22 is made of durable but inexpensive material.

As best shown in Figure 2 of the drawing it is not necessary that the loose fibrous insulation 24 be co-extensive with the entire side of the inner bag 16. This makes it possible to use insulation in which portions of the insulation are thinner in some locations than in other locations and in which the most efficient type of insulation extends into that part of the bag which is of reduced thickness.

In the embodiment shown, an outer refrigerator access door 40 is provided as usual at the front of the cabinet and this door is filled with bagged insulation of the type shown in Figure 1 of the drawing. The freezer compartment 42 of the refrigerator is provided with an inner door 44 which is supported by the usual plastic throat element 46 provided adjacent the entrance to the freezer compartment 42. The freezer compartment 42 is separated from the usual higher temperature food storage compartment 48 by means of an insulated partition 50 which also includes the dual bag type insulation shown in Figure 1.

While the form of embodiment of the invention as herein disclosed constitutes a preferred form, it is to be understood that other forms might be adopted, as may come within the scope of the claims which follow.

What is claimed is as follows:

1. In a refrigerator, an outer wall, an inner wall spaced from said outer wall, insulation between said walls, said insulation comprising first hermetically sealed bag means, filler material within said first bag means having voids therein, and a gas filling said voids, said gas having a coefficient of thermal conductivity less than that of air, and second bag means enclosing said first bag means and having breather opening means in one of its walls, said second bag means being larger than first bag means whereby said first bag means may expand and contract within said second bag means without distorting the walls of said second bag means.

2. In a refrigerator, an outer wall, an inner wall spaced from said outer wall, insulation between said walls, said insulation comprising first bag means, filler material within said first bag means having voids therein, and a gas filling said voids, said gas having a coefficient of thermal conductivity less than that of air, said first bag means having a thickness less than the distance between said walls, and second bag means enclosing said first bag means and being larger than said first bag means whereby said first bag means may expand and contract without distorting the walls of said second bag means, the walls of said first bag means comprising a first layer of material substantially impervious to the passage of air and a second layer of material substantially impervious to the passage of said gas.

3. In a refrigerator, an outer wall, an inner wall spaced from said outer wall, insulation between said walls, said insulation comprising first bag means, filler material within said first bag means having voids therein, and a gas filling said voids, said gas having a coefficient of thermal conductivity less than that of air, said first bag means having a thickness less than the distance between said walls, and second bag means enclosing said first bag means and being larger than said first bag means whereby said first bag means may expand and contract within said second bag means without distorting the walls of said second bag means, said first bag means comprising a first layer of material substantially impervious to the passage of air and a second layer substantially impervious to the passage of said gas, one of said layers comprising a copolymer of vinyl chloride and vinylidene chloride and another of said layers comprising a polyester of ethylene glycol and terephthalic acid.

4. In a refrigerator, an outer wall, an inner wall spaced from said outer wall, insulation between said walls, said insulation comprising first sealed bag means, filler material within said first bag means having voids therein, a gas filling said voids, said gas having a coefficient of thermal conductivity less than that of air, and second bag means enclosing said first bag means and being larger than first bag means whereby said first bag means may expand and contract without distorting the walls of said second bag means, and compressible insulation in the space between said first bag means and said second bag means.

5. In a refrigerator, an outer wall, an inner wall spaced from said outer wall, insulation between said walls, said insulation comprising first sealed bag means, filler material within said first bag means having voids therein, a gas filling said voids, said gas having a coefficient of thermal conductivity less than that of air, and second bag means enclosing said first bag means and being larger than first bag means whereby said first bag means may expand and contract without distorting the walls of said second bag means, and compressible insulation in the space between said first bag means and said second bag means, and said second bag means having a vent for equalizing the pressure therein with the atmospheric pressure.

6. In a refrigerator, an outer wall, an inner wall spaced from said outer wall, insulation between said walls, said insulation comprising first bag means, filler material within said first bag means having voids therein, and a gas filling said voids, said gas having a coefficient of thermal conductivity less than that of air, said first bag means having a thickness less than the distance between said walls, compressible insulation adjacent said first bag means, and second bag means enclosing said first bag means and said compressible insulation whereby said first bag means may expand and contract in response to pressure changes in and around said first bag means without distorting the walls of said second bag means, said second bag means having a breather opening therein for equalizing the pressure in the space between said first and second bag means with the atmospheric pressure.

7. In a refrigerator, an outer wall, an inner wall spaced from said outer wall, the distance between said inner wall and said outer wall being greater in one area than in another area, insulation between said walls, said insulation comprising a hermetically sealed first bag means, insulating material within said first bag means having a coefficient of thermal conductivity less than that of air, said first bag means having portions extending throughout portions of both of said areas, compressible insulation adjacent portions of said first bag means located adjacent one of said areas, and an outer bag enclosing said hermetically sealed bag and said compressible insulation for protecting said hermetically sealed bag and for holding said compressible insulation in assembled relationship with said hermetically sealed bag.

8. In a refrigerator, an outer wall, an inner wall spaced from said outer wall, insulation between said walls, said insulation comprising first bag means, filler material within said first bag means having voids therein, and a gas comprising difluorodichloromethane filling said voids, said first bag means having a thickness less than the distance between said walls, and second bag means enclosing said first bag means and having a thickness greater than first bag means whereby said first bag means may expand and contract without distorting the walls of said second bag means.

9. An insulating structure comprising two walls fixed with respect to each other in spaced relation, a unitary insulation member between said walls comprising means forming a hermetically sealed compartment and a vented compartment separated from one another by an imperforate membrane, said hermetically sealed compartment containing filler material having voids therein and a gas in said voids having a coefficient of thermal conductivity less than that of air, compressible insulation in said vented compartment, said membrane being capable of flexing toward said compressible insulation whereby said sealed compartment may expand thereagainst, hermetically sealed compartment being substantially impervious to the passage of said insulating gas and air therethrough, said vented compartment being substantially impervious to the passage of moisture therethrough.

10. A unitary bag insulation member adapted to be interposed between inner and outer walls of a refrigerator cabinet, comprising means forming a hermetically sealed compartment and a vented compartment separated by flexible wall means, said hermetically sealed compartment containing a filler having voids therein and a gas in said voids having a coefficient of thermal conductivity less than that of air, said vented compartment enclosing a compressible insulation against which said sealed compartment may expand, hermetically sealed compartment being substantially impervious to the passage of said insulating gas and air therethrough, said vented compartment being substantially imperious to the passage of moisture therethrough.

11. A unitary bag insulation member adapted to be interposed between walls arranged in fixed relation, comprising flexible means forming a hermetically sealed compartment and a vented compartment in contact with one another, said sealed compartment containing filler material having voids therein and a gas in said voids having a coefficient of thermal conductivity less than that of air, said vented compartment enclosing a compressible insulation whereby expansion of said sealed compartment is relieved by said compressible insulation, hermetically sealed compartment being substantially impervious to the passage of said insulating gas and air therethrough, said vented compartment being substantially impervious to the passage of moisture therethrough.

References Cited in the file of this patent

UNITED STATES PATENTS

| 1,896,046 | Farrington | Jan. 31, 1933 |
| 2,622,754 | Eagles | Dec. 23, 1952 |
| 2,779,066 | Gangler | Jan. 29, 1957 |